United States Patent
Shakal

(10) Patent No.: US 7,128,553 B2
(45) Date of Patent: Oct. 31, 2006

(54) INJECTION MOLDING APPARATUS AND METHOD

(75) Inventor: Wayne A. Shakal, Taylors Falls, MN (US)

(73) Assignee: Advance Tool, Inc., Blaine, MN (US)

( * ) Notice: Subject to any disclaimer, the term of this patent is extended or adjusted under 35 U.S.C. 154(b) by 273 days.

(21) Appl. No.: 10/673,043

(22) Filed: Sep. 26, 2003

(65) Prior Publication Data

US 2005/0067738 A1    Mar. 31, 2005

(51) Int. Cl.
B29C 45/32    (2006.01)

(52) U.S. Cl. ............... 425/190; 425/572; 425/574; 425/576

(58) Field of Classification Search ............ 425/572, 425/574, 576
See application file for complete search history.

(56) References Cited

U.S. PATENT DOCUMENTS

| | | | |
|---|---|---|---|
| 2,853,786 A | 9/1958 | Ellstrom | |
| 3,100,913 A | 8/1963 | De Matteo et al. | |
| 3,621,533 A | 11/1971 | Bertrandi | |
| 3,655,317 A | 4/1972 | Funkhouser et al. | |
| 3,700,369 A | 10/1972 | Johnson | |
| 3,707,591 A | 12/1972 | Chalfant | |
| 3,784,348 A | 1/1974 | Aoki | |
| 3,792,946 A | 2/1974 | Zavasnik | |
| 3,853,451 A | 12/1974 | Bendzick | |
| 3,918,866 A | 11/1975 | Eichenberger et al. | |
| 4,125,247 A | 11/1978 | Gabrys | |
| 4,201,535 A | 5/1980 | Ninneman | |
| 4,313,905 A | 2/1982 | Hafele | |
| 4,330,257 A | 5/1982 | Rees et al. | |
| 4,422,995 A | 12/1983 | Schad | |
| 4,449,913 A | 5/1984 | Krishnakumar et al. | |
| 4,579,518 A | 4/1986 | Farrell | |
| 4,786,455 A | 11/1988 | Krishnakumar et al. | |
| 4,836,767 A | 6/1989 | Schad et al. | |
| 5,114,327 A | 5/1992 | Williamson et al. | |
| 5,569,476 A | 10/1996 | Van Manen et al. | |
| 5,582,788 A | 12/1996 | Collette et al. | |
| 5,773,049 A * | 6/1998 | Kashiwa et al. | ............ 425/572 |
| 6,143,225 A | 11/2000 | Domodossola et al. | |
| 6,168,416 B1 | 1/2001 | Galt | |

(Continued)

Primary Examiner—Tim Heitbrink
(74) Attorney, Agent, or Firm—Fredrikson & Byron, PA

(57) ABSTRACT

A molding machine and method for reducing the length of a mold cycle by enabling access to a previously molded part while the mold is closed. The machine includes a fixed platen and a platen movable toward and away from the fixed platen. A turret having a plurality of faces is positioned between the fixed and movable platens such that rotatation thereof brings different faces of the turret into alignment with the fixed platen. The fixed platen and at least two opposed turret faces have complementary mold halves that, when closed, define between them the desired shape of a part to be molded. The turret includes an actuator for moving the turret in the direction of movement of the movable platen between a molding position in which the mold halves of one turret face and the complementary mold halves of the fixed platen are closed on each other and an open position in which the turret may rotate about its axis of rotation, the actuator being capable of so moving the turret or of not moving the turret independently of the movement of the movable platen. Movement of the platen away from the turret without opening the mold enables time-saving access to a previously molded part at the opposite face of the turret.

20 Claims, 3 Drawing Sheets

U.S. PATENT DOCUMENTS

| | | |
|---|---|---|
| 6,290,891 B1 | 9/2001 | Galt |
| 6,299,431 B1 | 10/2001 | Neter |
| 6,386,849 B1 | 5/2002 | Kroeger et al. |
| 6,461,141 B1 | 10/2002 | Harrison et al. |
| 2002/0014720 A1 | 2/2002 | Sicilia et al. |

* cited by examiner

INJECTION MOLDING APPARATUS AND METHOD

FIELD OF THE INVENTION

The invention relates to injection molding machines and methods.

BACKGROUND OF THE INVENTION

In the field of injection molding, U.S. Pat. No. 4,330,257 describes an injection molding machine that utilizes a fixed platen, a moveable platen, and an intermediate turret having four faces so that the faces are sequentially presented to the fixed platen as the turret rotates. The device includes mold halves and cores forming voids into which molten plastic is forced under pressure during a molding cycle. The turret carries cores on each of its faces, and complementary mold halves receiving the cores are attached to the fixed platen.

According to this patent, in operation, the movable platen forces the turret toward and against the cavity mold half carried by the fixed platen. Once a "shot" has been injected, the moveable platen and the turret are simultaneously drawn away from the fixed platen, and the turret is rotated through, e.g. 90 degrees, to present a new turret face to the fixed platen. The turret is moved away from the fixed platen by small hydraulic jacks 30, 33. The four positions of the turret, as it rotates through 90 degree arcs, may be termed positions 1, 2, 3 and 4, and the faces of the turret may be termed A, B, C, and D. Injection occurs at position 1. Ejection occurs at position 4. Initially, turret face A is at position 1. After injection of a first shot, the movable platen moves away from the turret and concurrently the turret moves away from the fixed platen to expose the molded articles carried by the core. The turret rotates through 90 degrees to bring another set of bare cores on turret face D into position 1, and the turret and movable platen then close and a second injection shot is performed. The turret and movable plate again move to their open positions and the turret is rotated through an additional 90 degrees. Now, turret face A is at position 3, with the cores extending into a hollow member 18 that enables the member to apply tonnage against the turret. The mold is closed again, and injection of a third shot occurs. The turret and movable plate again simultaneously move to their open positions and the turret is rotated through an additional 90 degrees. Now, turret face A is at position 4, and at this position, the molded articles are stripped from the cores as the mold closes again for a fourth shot. The mold is opened and the turret is again rotated through 90 degrees to bring the now bare cores on face A into registration with the cavities, and the process continues. After each injection, the mold remains closed and under pressure for a period. The mold is then opened and the turret is rotated. This system has the advantage of exposing the molded articles carried by the cores at positions 2 and 4, with ejection of the articles occurring at position 4.

The cost of producing a molded part depends upon a variety of factors. Of these, an important factor involves how rapidly parts can be produced, that is, how short can be the "cycle time", that is, the time period between successive injection events. Methodology and equipment enabling cycle times to be reduced would contribute importantly to cost reductions in a molding operation.

SUMMARY OF THE INVENTION

The purpose of the invention is to reduce the amount of time that is required to injection mold a given part. As background, the mold halves of an injection molding machine are maintained below the freezing temperature of the plastic that is injected. Once molten plastic is injected into the mold cavity, the formed plastic slowly cools. Commonly the injected plastic shrinks away from the cavity mold half and shrinks onto the core mold half.

Once injection occurs, the plastic is held under pressure during it's "injection, pack and hold" time segment. After this time segment expires, it has been found that reducing pressure on the mold has no significant adverse affect upon the molded part. However, before the part can be readily ejected from the mold, an additional cooling time segment is required. For example, a part may have a pack and hold period in the range of eight to ten seconds, and a part should be permitted to cool further for an additional period, for example, in the range of 10 to 20 seconds, before it is ejected, but these time periods can vary substantially.

According to one embodiment of the invention, an injection molding machine having fixed and movable platens is provided with a turret having a plurality of faces, desirably two, four, or another multiple of two, the turret being rotatable about an axis perpendicular to the direction of movement of the movable platen to bring different faces of the turret into alignment with the fixed platen. The fixed platen is provided with at least one mold half, and at least two oppositely facing faces of the turret are provided with complementary mold halves. One or more actuators are provided to move the turret in the direction of movement of the movable platen between a molding position in which the mold halves of one turret face and the complementary mold halves of the fixed platen are closed on each other, and an open position in which the turret may rotate about its axis of rotation. The actuators move the turret independently of the movement of the movable platen so that the movable platen may be moved away from the turret without movement of the turret away from the fixed platen.

In another embodiment of the invention, a method is provided for rapidly injection molding parts using the above described injection molding equipment. In the method, molten plastic is injected into the closed molds, and the molds are maintained under pressure for the duration of the injection, pack and hold period, following which the movable platen, but not the turret, is moved away from the fixed platen to enable one or more processes, e.g., additional cooling, insert loading, part transfer, and ejection, to be carried out upon the now exposed molded part. Upon further cooling, the actuator withdraws the turret from the fixed platen, and the turret is rotated to bring another face into registration with the fixed platen. The actuators then draw the turret toward the fixed platen to close the mold, and the movable platen then moves to apply pressure to the turret, allowing the molding cycle to be repeated.

DETAILED DESCRIPTION

As used herein, the "pack and hold" time segment refers to the time period, following injection, that is required for the molded parts to remain under pressure in the closed mold. The "inject, pack and hold" time segment adds the time required for injection of a "shot" into the mold. "Mold half" refers to a mold portion (not necessarily one half, volumetrically or geometrically) that, when coupled to another mold half, completes a closed mold into which a flowable material may be injected during a molding operation. A mold half may include a cavity, or may include a core that is received in a cavity, or other shape, and may contain any of a number of inserts and the like. The configuration of mold halves is well known to the field of injection molding and need not be described further.

The invention makes use of "actuators" that join the turret and the fixed platen and operate to move the turret toward and away from the fixed platen independently of the movable platen. Thus, when plastic has been injected into the mold and the required pack and hold time has expired, the movable platen can be moved away from the turret, the turret being held against the fixed platen by the actuators.

In the instant invention, the inventors have noted that the injected plastic need be held under pressure only for the inject, pack and hold time segment, following which the pressure may be released. This, in turn, enables access to be had to previously molded parts without disturbing the parts still in the closed molds and thus expands the available time between injection shots that the previously molded parts are available to be cooled, ejected, or otherwise worked on. By thus avoiding the need for extra cycle time to work on the molded parts, the cycle time can be reduced approximately by the time thus saved.

Figure 1:
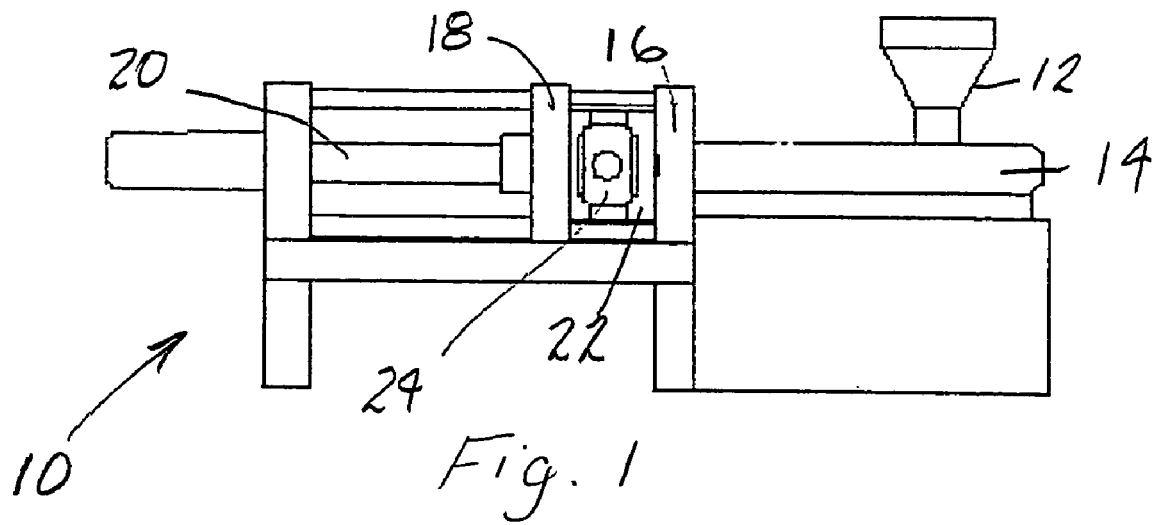
FIG. 1 is schematic side view of a machine of the invention.

Referring to FIG. 1 of the drawing, an injection molding machine 10 is depicted having a hopper 12 containing moldable plastic pellets, and a heated screw extruder 14 for receiving pellets from the hopper and for melting and extruding molten plastic into molds. The machine includes a fixed platen 16 and a movable platen 18 movable toward and away from the fixed platen by drive shafts 20. Carried by the fixed platen 16 is a mold half 22. In the illustrations that follow, the fixed platen 16 and mold half 22 are shown and sometimes referred to as a single unit.

Figure 3:
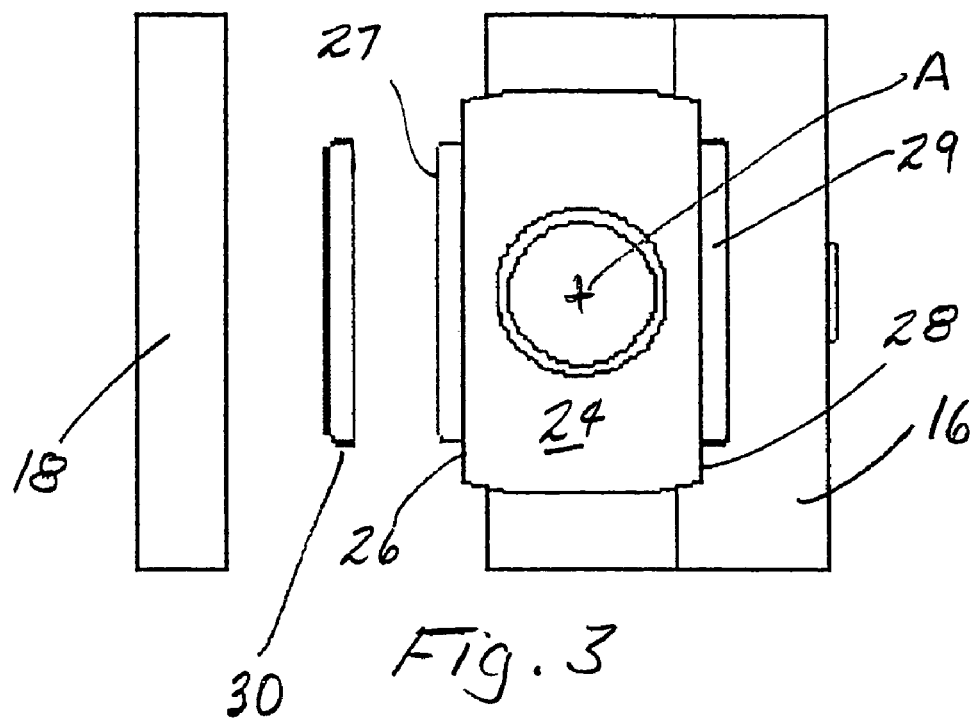
FIG. 3 is a view similar to that of FIG. 2 but illustrating a step in a method of the invention.
Figure 4:
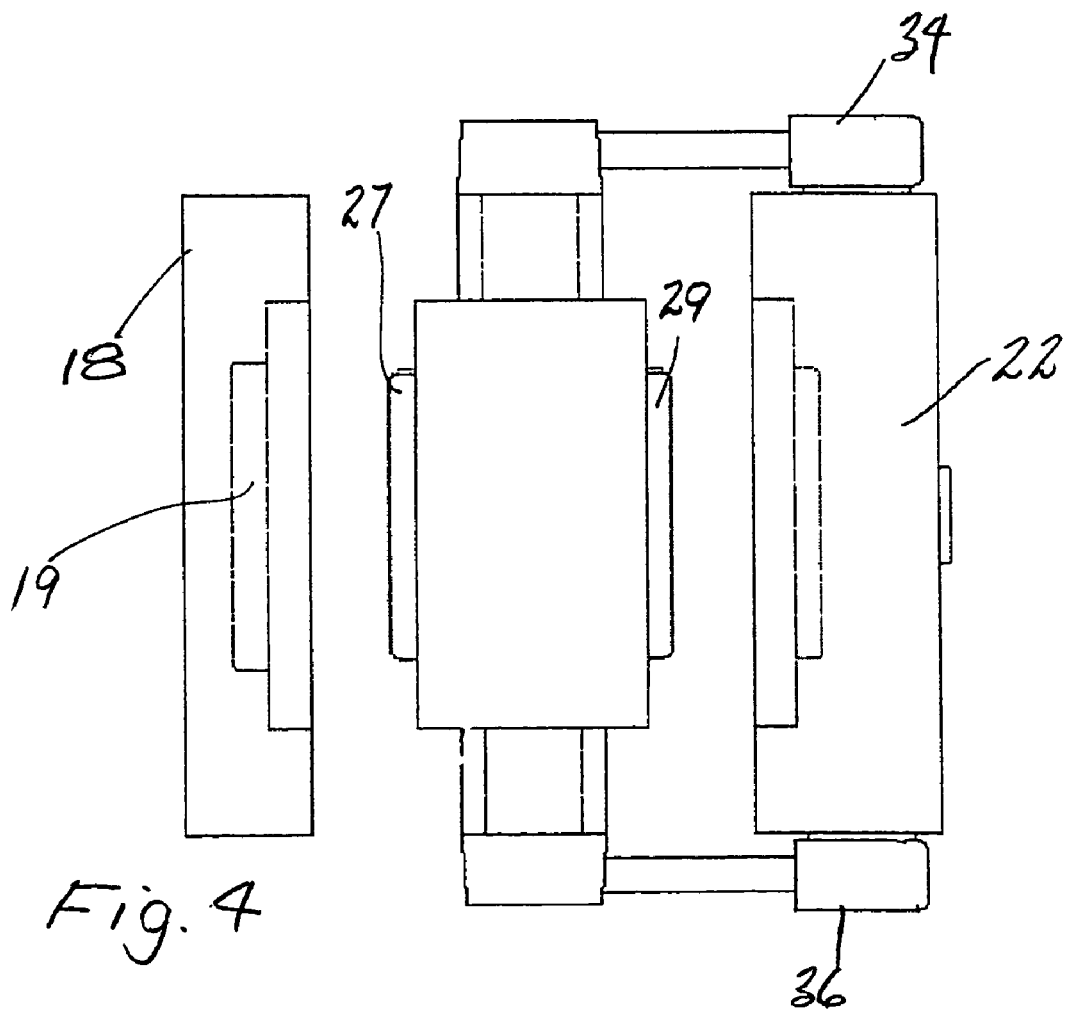
FIG. 4 is a view similar to that of FIG. 3 but illustrating another step in a method of the invention.

Carried between the fixed and movable platens is a turret 24 having a plurality of sides. The turret is rotatable about an axis (FIG. 3) that is perpendicular to the direction of movement of the moveable platen so that, by rotating the turret, any of its faces may be brought into registration with the fixed platen 16. The turret exemplified in the drawing has two opposed, oppositely facing faces 26, 28 that bear mold halves 27, 29, respectively. As shown in FIG. 4, the moveable platen 18, or a plate attached to it, may be sufficiently recessed, as shown at 19, to receive a mold half borne by the turret. In the drawing, the mold halves 27, 29 that are carried by the turret are cores that protrude outwardly from the faces of the turret, and the mold half 16 contains a cavity into which the cores may extend when the mold is closed. The space between the confronting surfaces of the mold halves of the closed mold defines the shape of the object to be molded. The molded object 30 (FIG. 3) may, for example, be a plastic dish, the interior of the dish being formed by the mold half 29 and the outer surface of the dish being formed by the mold half 16.

Figure 2:
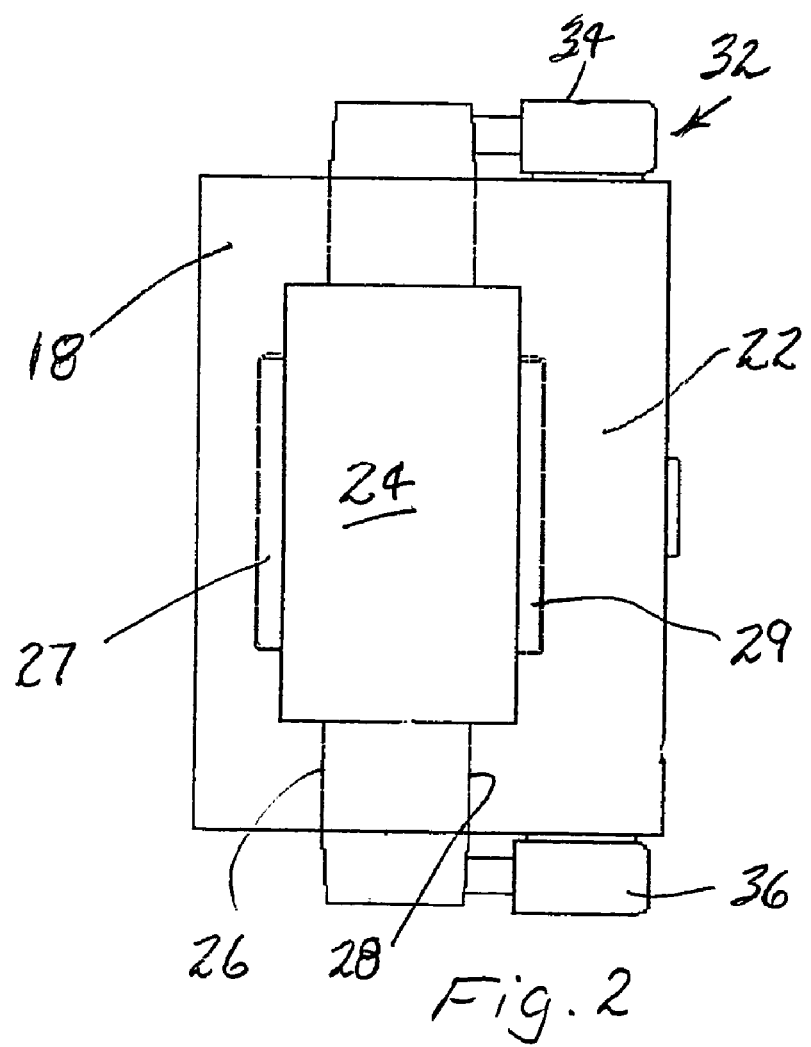
FIG. 2 is a largely schematic side view of closed mold halves and a turret forming part of the machine of FIG. 1.

Shown in FIGS. 2 and 4 is an actuator 32, the function of which is to hold the turret against the mold half 22 and also to move the turret 24 away from the mold half 22, all of which is explained in greater detail below. The actuator 32 desirably comprises a pair of actuators 34, 36 balanced on opposite sides of the turret. Shown in the drawing are hydraulic cylinders, but pneumatic cylinders or other mechanical linkages may be employed as well. A variety of mechanical linkages, such as rack and pinion and screw drive linkages, may be employed to force the turret away from the fixed platen. Although the actuators may be double acting, that is, they may move the turret in both directions toward and away from the fixed platen, it is necessary only that the actuators function to move the turret away from the fixed platen so that the turret itself can be freely rotated. As shown in the drawing, the hydraulic cylinders 34 are attached between the turret and the fixed platen, either directly or through intermediate linkages such as the mold half 22 or to the stationary frame of the molding machine.

As described below, in a molding operation, the mold is closed as shown in FIG. 2 with the movable platen applying pressure against the turret which in turn is pressed against the mold half carried by the fixed platen. Injection of plastic occurs from the extruder 14 through one or more sprues (not shown) into the mold. Once the injection, pack and hold time period has expired, the movable platen is moved away from the turret but the turret itself is maintained in contact with the mold half carried by the fixed platen, all as shown in FIG. 3. Movement of the movable platen in this manner serves to expose the previously molded article 30 that is carried by the mold half 27, but the most recently molded part continues to cool in the closed mold. The molded part 30 can then be ejected as seen in FIG. 3 or can be further operated upon. Finally, the actuators 36, 34 move the turret away from the mold half 22 carried by the fixed platen, as shown in FIG. 4, and at this point the turret can be rotated about its axis to bring the other, opposed face 26 into alignment with the mold half carried by the fixed platen.

Figure 5:
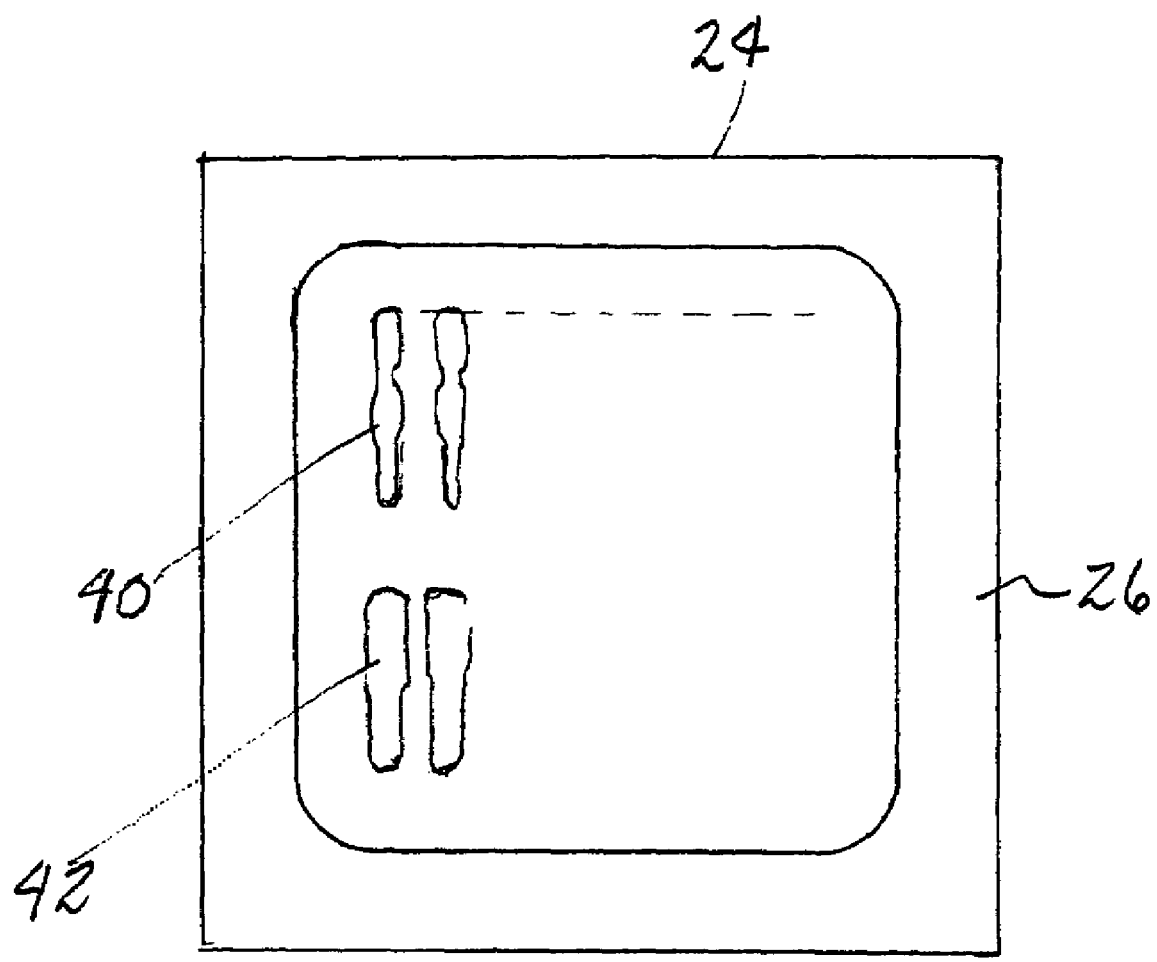
FIG. 5 is a partial plan view of a turret face having separate sets of mold halves, as in the case of a multi-material application.

The invention is well-suited to the use of multi-cavity molds, and is useful when parts having two or more different plastic portions are to be molded. FIG. 5 is a partial view of the face of a turret having a first set of cavities 40 in its upper half and a second set of somewhat larger or differently configured cavities 42 in its lower half. Once the first set of cavities have been appropriately filled by an injected plastic and cooled, these parts can be transferred to the second set of cavities 42 for injection of a different plastic. Movement, which may be robotic, of the parts from the first set of cavities 40 to the second set of cavities 42 may be one of the operations that occurs after the moveable platen has been moved away from the turret, but before the mold has been opened.

In practicing the invention, one may use a turret having cavities and cores on two opposed faces. When the turret rotates through 180 degrees, accordingly, it presents a second face to the fixed platen. In one example, the process of a production run may be described with respect to sequentially molded pieces 1, 2, 3 and 4. The description begins after piece number 1 has been molded and, after opening the mold, the turret has been rotated through 180 degrees. The actuators draw the turret toward the fixed platen to engage the mold halves of the fixed platen, the movable platen is then closed on the turret to place the closed mold under pressure, and the shot for piece number 2 is injected.

Pressure is maintained by the movable platen against the mold during the duration of the pack and hold time segment, e.g., 8 seconds, following which the moveable platen is withdrawn to expose the previously molded number 1 pieces carried by their cores. At this point, other procedures can be carried out in connection with the number 1 pieces, such as adding inserts, ejection, further cooling, etc. As the number 2 pieces are further cooled, the number 1 pieces are ejected (or are retained in that mold half for further processing as described below). The turret is withdrawn from the fixed platen to expose the mold cavity, the number 2 pieces being retained on the cores. The turret is rotated through an additional 180 degrees, is moved into contact with the fixed platen to close the mold cavity, the movable platen is moved into contact with the turret to apply pressure to it, and the molding cycle continues.

This procedure enables one to use the time normally spent in the additional cooling period (after the pack and hold segment) to perform further operations, and thus speeds up operation of the injection molding machines. The invention may be further appreciated with respect to the molding of two-piece toothbrush handles utilizing two different plastic materials. Products of this type are known in the field, one of the plastics usually being polypropylene or the like and the other being a more rubbery material that gives a good gripping surface. The turret may, for ease of explanation, have two oppositely facing faces, each bearing a first set of "white" cavities representing half of the form of the white-colored portion of the toothbrush, and also a second set of "yellow" cavities representing half of the final configuration of the two-color toothbrushes, the other plastic being yellow. The other "half" of each of the two sets of cavities, of course, is borne by the fixed platen, which also includes the necessary sprues to conduct the different molten plastic materials to the proper molds.

Once the mold has been closed and pressurized, with the "white" cavities together forming the configuration of the white portion of the toothbrush, a shot of white plastic is injected. Upon expiration of the pack and hold period, the movable platen is opened, and shortly thereafter the turret is withdrawn by the actuators from the fixed platen and rotated through 180 degrees. The turret is then moved by the actuators into registration with the fixed platen and the moving platen is moved into contact with the turret to provide the needed pressure for the next shot. To accommodate the number 1 white pieces, the movable platen may have a plate with a suitably recessed interior to accommodate these pieces.

Another shot of white plastic is injected into the closed mold to make molded piece number 2. For this piece, once the pack/hold time period ends, the moveable platen may be withdrawn, thereby exposing the number 1 white pieces for further processing. These pieces may then be moved by various means into the second cavity set of the turret face, e.g., by rotating the cores as a unit. For example, the first cavity set may be located in the bottom half of the turret face and the second set in the top half so that the number 1 white pieces can be merely moved from the bottom to the top cavity set. The turret is then moved away from the fixed platen and is rotated through 180 degrees. This brings the number 1 white pieces back into registration with the fixed platen, with these pieces now positioned in the second cavity set.

The turret and then the moveable platen are then again closed against the fixed platen, and this time two shots are simultaneously injected: Into the first cavity set is injected white plastic; this is the start of the number 3 white pieces. Into the second cavity set now bearing the number 1 white pieces is injected a yellow, softer plastic, this comes onto contact with and is bonded to the white plastic of the number 1 pieces to make the final molded product.

At this point, the closed mold contains the number 3 white pieces in the first cavity set and the finished number 1 white/yellow pieces in the second cavity set. Once the pack/hold segment has timed out, the moveable platen is moved away from the turret to expose the number 2 white pieces, which are then are moved, e.g., robotically, to the second cavity set carried by the turret, thus emptying the turret's first cavity set again. The turret is again withdrawn from the fixed platen by the actuators, is rotated through 180 degrees, and is again closed as described above. White plastic is injected into the first cavity sets to begin the molding of the number 4 pieces, and yellow plastic is injected into the second cavity sets. Upon timing out of the pack and hold period, the movable turret face is withdrawn to expose the number 3 white pieces in the first cavity set and also the finished white/yellow number 2 pieces in the second cavity set. These completed number 2 pieces are ejected and the number 3 white pieces are moved into the now empty second cavity set, and the cycle is repeated.

The following comparison may be made between cycle times (in seconds) of the above described example and of a standard molding machine (having no rotatable turret):

| Cycle Componeent | Standard Machine | Invention |
| --- | --- | --- |
| Mold close | 2 | 2 |
| Inject | 2 | 2 |
| Pack-hold | 5 | 5 |
| Cool | 25 | 8 |
| Open | 2 | 2 |
| Eject/transfer/rotate | 4 | 2 |
| Total cycle time | 40 | 21 |

During steady-state production, then, in accordance with the above example, every injection step actually injects two separate plastic materials, one white to begin production of a part, and one yellow to mate with a white part made in a preceding cycle. Each time the movable platen is withdrawn from the turret to expose the molded items, the completed white and yellow pieces will be ejected from the second cavity set and that set will become filled with the white pieces moved from the first cavity set.

Of importance to the cycle rapidity of the present invention is the ability to move the movable platen out of contact with the turret while otherwise maintaining the turret in contact with the fixed platen in a mold-closed configuration, movement of the movable platen by itself away from the turret thus affording access to a previously molded part carried by the turret for further processing.

Although each molded item is necessarily contained in the mold under pressure for the pack/hold time segment, the invention provides substantially the entire additional cooling time of one shot to operate upon the molded items from the proceeding shot, so that at least two molding operations are being handled at the same time.

Although the preceding description refers particularly to a turret having two opposed faces, the turret may have four or any other convenient, preferably even, number of faces.

Another example involves the somewhat more simple molding of a dinner plate having a label or trademark at its bottom. The mold may consist of two mold halves, one for the back of the plate and the other for the front of the plate. In this case, however, the mold half for the back of the plate is mounted to the turret, and the mold half for the front of the plate is mounted to the fixed platen. Description of the molding cycle begins after the first piece has been molded, the pack/hold time has expired, the mold has been opened, and the turret has been rotated through 180 degrees. Upon ejection of this first, test plate, a label may be placed in the open mold half at its center, for example. Once the cooling cycle of the number 2 piece has been completed, the turret would be withdrawn from the fixed platen and rotated through 180 degrees. The mold would then again be closed, with the movable platen applying pressure to the mold halves. Plastic injected into the mold cavity flows around the label, with the label being maintained on the bottom of the plate being molded. As the pack/hold time segment times out, the moveable platen is withdrawn to expose the front side of the previously molded plate, that plate is ejected (with its label clearly showing), and a new label is placed in the mold.

Although the invention has been described primarily in connection with mold halves that separate from each other when the turret is moved away from the fixed platen, it may be desirable to utilize a molding apparatus in which both mold halves remain with the turret as the turret is withdrawn from the fixed platen. Reference is made to co-owned U.S. provisional application Ser. No. 60/480,633, filed Jun. 23, 2003, the contents of which are incorporated herein by reference. Once the pack/hold time segment has expired, the movable platen is withdrawn from the turret to expose the confronting mold half. In the cycle time provided while the movable platen and turret are in this configuration (or, if the turret has four operating faces, this cycle time plus the cycle time afforded as the turret is rotated through another 90 degrees), the mold half may be removed, the molded part may be ejected or otherwise worked on, and the mold half replaced. By withdrawing the movable platen from the turret right after conclusion of the pack/hold period, this invention provides additional time in which to perform operations on the molded part and/or to the mold equipment that is exposed by movement of the movable platen.

The molding apparatus consists of a injection molding machine, including fixed and movable platens, mold halves and cores, a cooling system, a screw-driven injector, heaters, various temperature and timing controls, and also mold tooling. The molding tooling comprises the rotary turret bearing mold halves and cores, mold halves attached to the fixed platen, and a plate attached to the movable platen and having a cavity for receiving cores and other mold pieces carried by the turret. This plate likely would engage the turret at its peripheral edges or elsewhere to transmit pressure to the closed mold. Linear actuators are carried between the turret and the fixed plate for moving the turret toward and away from the fixed platen. This allows the movable platen to be moved away from the turret without causing the turret to retract from the fixed platen. Rather, the turret may remain attached to the fixed platen until it is moved away (after cooling) through the use of the actuators. Actuators may include a wide variety of mechanical, pneumatic or hydraulic linkages capable of pushing the turret away from the fixed platen in the direction of movement of the movable platen.

In a typical molding operation, then, the sequence of movements of the movable platen and the turret is be as follows:

1. After injection and timing out of the pack/hold time segment, the movable platen alone is moved away from the turret, exposing previous molded parts carried by the turret and releasing pressure on the closed mold. Here, the exposed molded parts may be ejected, transferred, or otherwise worked on, as by adding inserts.
2. The turret is moved away from the fixed platen through the use of the actuators to a position enabling the turret to rotate.
3. After rotation of the turret, the turret is drawn back to its initial position to close the mold halves adjacent the fixed platen.
4. Pressure is applied to the closed mold by the movable platen.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. An injection molding machine having a fixed platen and a movable platen movable toward and away from the fixed platen, the machine including an injection mold tooling assembly that comprises (a) a first mold half that is removably attached to the fixed platen, (b) a second mold half that is removably attached to the movable platen, and (c) a turret coupled to the first and second mold halves having a plurality of faces and positioned between the fixed and movable platens, wherein the entire injection mold tooling assembly comprises a single unit that is removable from the fixed and movable platens, the turret being rotatable about an axis perpendicular to the direction of movement of the movable platen to bring different faces of the turret into alignment with the first mold half, at least two opposed the turret faces having turret mold halves that are complementary to the first mold half that when closed define between them the desired shape of a part to be molded, the turret including an actuator for moving the turret in the direction of movement of the movable platen between a molding position in which the turret mold half of one turret face and the first mold half are closed on each other and an open position in which the turret may rotate about its axis of rotation, said actuator being capable of so moving said turret or of not moving said turret independently of the movement of the movable platen, whereupon the movable platen may be moved away from the turret without opening the mold to enable access to a previously molded part at the opposite face of the turret.

2. The machine of claim 1 wherein said second mold half includes a plate recessed to accommodate the turret mold half and molded parts borne by a first turret face after said parts have been molded and the turret has been rotated to orient said face opposite to the turret face facing the fixed platen.

3. The machine of claim 1 wherein said actuator extends between said turret and said first mold half.

4. The machine of claim 1 wherein said actuator comprises at least two hydraulic, pneumatic, or electric linear actuators carried at opposite sides of the turret and capable of together moving said turret out of engagement with the first mold half independently of movement of said movable platen.

5. An injection mold tooling assembly, comprising:
a first apparatus mold half configured to be connected to a fixed platen of an injection molding machine;
a second apparatus mold half configured to be connected to a movable platen of the injection molding machine, the movable platen being translatable toward and away from the fixed platen along a direction of travel;
a turret positioned between and coupled to the first and second apparatus mold halves, the turret having a plurality of turret faces, each turret face having a turret mold half; and
a turret actuator coupled to the turret, the turret actuator being configured (a) to translate the turret (i) along the direction of travel, (ii) relative to the first apparatus mold half, (iii) independently of the translation of the movable platen, and (iv) between a closed position in which one of the plurality of faces of the turret is pressed against the first apparatus mold half and an open position in which the turret is removed from the first apparatus mold half, and (b) to rotate the turret (i) about an axis that is generally perpendicular to the direction of travel, (ii) while the turret is in the open position, and (iii) through a first open position in which a first turret face is aligned with the first apparatus mold half and a second open position in which the first turret face is aligned with the second apparatus mold half,
wherein the entire injection mold tooling assembly comprises a single unit that is removably attachable to the injection molding machine.

6. The injection mold tooling assembly of claim 5, wherein molds made by pressing the turret mold halves together with the apparatus mold halves are configured to hold multiple molded articles.

7. The injection mold tooling assembly of claim 5, wherein one of the plurality of faces of the turret and the first apparatus mold half form a first mold when in the closed position.

8. The injection mold tooling assembly of claim 7, wherein the second mold half is configured to be pressed against a respective turret mold half to form a second mold.

9. The injection mold tooling assembly of claim 8, wherein the second mold is configured to add a second material to a previously molded article.

10. The injection mold tooling assembly of claim 9, wherein the previously molded article is part of a toothbrush handle.

11. The injection mold tooling assembly of claim 8, wherein the second mold is configured to mold material over a previously loaded insert.

12. The injection mold tooling assembly of claim 8, further comprising an ejector configured to eject a molded article from the second mold while the turret is in the closed position.

13. The injection mold tooling assembly of claim 5, wherein the turret actuator comprises at least two linear actuators carried at opposite sides of the turret.

14. The injection mold tooling assembly of claim 12, wherein the linear actuators are selected from the group consisting of hydraulic actuators, pneumatic actuators, electric actuators, or combinations thereof.

15. The injection mold tooling assembly of claim 5, wherein the turret has exactly two turret faces having turret mold halves, and the turret actuator is configured to rotate the turret only in multiples of 180 degrees.

16. The injection mold tooling assembly of claim 5, wherein, when the turret is in the closed position, one of the turret faces that is not pressed against the first apparatus mold half is configured to receive an insert to be molded over.

17. The injection mold tooling assembly of claim 5, wherein the turret actuator extends between the turret and the first apparatus mold half.

18. An injection mold tooling assembly, comprising:
a first apparatus mold half configured to be connected to a fixed platen of an injection molding machine;
a second apparatus mold half configured to be connected to a movable platen of the injection molding machine, the movable platen being translatable toward and away from the fixed platen along a direction of travel;
a turret positioned between and coupled to the first and second apparatus mold halves, the turret having exactly two turret faces that have turret mold halves; and
a turret actuator coupled to the turret, the turret actuator being configured (a) to translate the turret (i) along the direction of travel, (ii) relative to the first apparatus mold half, (iii) independently of the translation of the movable platen, and (iv) between a closed position in which one of the plurality of faces of the turret is pressed against the first apparatus mold half and an open position in which the turret is removed from the first apparatus mold half, and (b) to rotate the turret (i) about an axis that is generally perpendicular to the direction of travel, (ii) while the turret is in the open position, and (iii) through a first open position in which a first turret face is aligned with the first apparatus mold half and a second open position in which the first turret face is aligned with the second apparatus mold half,
wherein the entire injection mold tooling assembly comprises a single unit that is removably attachable to the injection molding machine, and
wherein the first and second open positions are spaced 180 degrees apart.

19. The injection mold tooling assembly of claim 18, wherein (a) one of the plurality of faces of the turret and the first apparatus mold half form a first mold when in the closed position, (b) the second mold half is configured to be pressed against a respective turret mold half to form a second mold, and (c) the second mold is configured to add a second material to a previously molded article.

20. The injection mold tooling assembly of claim 18, wherein (a) one of the plurality of faces of the turret and the first apparatus mold half form a first mold when in the closed position, (b) the second mold half is configured to be pressed against a respective turret mold half to form a second mold, and (c) the second mold is configured to mold material over a previously loaded insert.

* * * * *